United States Patent

Nakamura et al.

[11] Patent Number: 6,147,178
[45] Date of Patent: Nov. 14, 2000

[54] DIENE RUBBER, PROCESS FOR PRODUCING THE RUBBER AND RUBBER COMPOSITION CONTAINING THE SAME

[75] Inventors: Masao Nakamura; Yukio Takagishi, both of Kawasaki; Manabu Tomisawa, Tokyo, all of Japan

[73] Assignee: Nippon Zeon Co., Ltd., Tokyo, Japan

[21] Appl. No.: 09/125,681

[22] PCT Filed: Feb. 24, 1997

[86] PCT No.: PCT/JP97/00519

§ 371 Date: Aug. 24, 1998

§ 102(e) Date: Aug. 24, 1998

[87] PCT Pub. No.: WO97/31028

PCT Pub. Date: Aug. 28, 1997

[30] Foreign Application Priority Data

Feb. 23, 1996 [JP] Japan .................................. 8-061776

[51] Int. Cl.[7] .......................... C08F 236/06; C08F 236/10
[52] U.S. Cl. ........................ 526/340; 526/347; 526/173; 502/157; 524/492; 525/332.9; 525/333.1; 525/333.3; 525/333.6
[58] Field of Search ..................... 526/340, 173, 526/347; 525/332.9, 333.1, 333.3, 333.6; 524/492; 502/157

[56] References Cited

U.S. PATENT DOCUMENTS

| | | |
|---|---|---|
| 4,052,542 | 10/1977 | Wei et al. .................................. 526/46 |
| 4,222,906 | 9/1980 | Briggs et al. . |
| 4,894,409 | 1/1990 | Shimada et al. ........................ 524/492 |
| 4,927,887 | 5/1990 | Tate et al. . |
| 4,988,773 | 1/1991 | Bronstert ............................... 525/332.9 |
| 5,128,416 | 7/1992 | Imai et al. ............................... 525/254 |
| 5,219,938 | 6/1993 | Imai et al. ............................... 525/102 |

FOREIGN PATENT DOCUMENTS

| | | |
|---|---|---|
| 1-101344 | 4/1989 | Japan . |
| 1-188501 | 7/1989 | Japan . |
| 5-230286 | 9/1993 | Japan . |
| 1 342 269 | 1/1974 | United Kingdom . |
| 2 138 005 | 10/1984 | United Kingdom . |

*Primary Examiner*—David W. Wu
*Assistant Examiner*—R. DeShon Harlan
*Attorney, Agent, or Firm*—Armstrong, Westerman, Hattori, McLeland & Naughton

[57] ABSTRACT

A diene rubber comprised of a conjugated diene homopolymer or a conjugated diene/aromatic vinyl copolymer; the homopolymer or copolymer having on at least one end of its polymer chain a quaternary ammonium group to which four carbon atoms have been bound; at least 10% of the bound conjugated diene units being a vinyl bond; and the homopolymer or copolymer further having a weight average molecular weight (Mw) of 100,000 to 2,000,000. This rubber exhibits well reduced heat build-up, which is an index of a well reduced rolling resistance, and having tensile strength and abrasion resistance.

16 Claims, No Drawings

DIENE RUBBER, PROCESS FOR PRODUCING THE RUBBER AND RUBBER COMPOSITION CONTAINING THE SAME

TECHNICAL FIELD

This invention relates to a diene rubber having a quaternary ammonium group, which is characterized as, when silica is incorporated therein, exhibiting a reduced heat build-up and having improved tensile strength and abrasion resistance; a process for producing the diene rubber; and a diene rubber mixture containing the diene rubber. Further, it relates to a rubber composition comprising a rubber ingredient containing the quaternary ammonium group-having diene rubber, and a reinforcing agent.

BACKGROUND ART

In recent years, a serious view has been taken for saving resources and cleaning up the environment, and thus, the reduction of fuel consumption of automobiles is required severely. For the reduction of fuel consumption, reduction of rolling resistance of tires is desired. The reduction of rolling resistance of tires is attained usually by using a rubber material capable of providing a rubber vulcanizate exhibiting a reduced heat build-up.

Incorporation of silica as a reinforcing agent instead of carbon black, in a diene rubber, has heretofore been proposed to give a rubber composition capable of exhibiting a reduced heat build-up. However, the silica-incorporated diene rubber composition has a problem such that the tensile strength and abrasion resistance are poor as compared with the carbon black-incorporated diene rubber composition. This would be due to the fact that silica has poorer affinity than carbon black to a diene rubber, and thus, the silica does not exhibit highly enhanced reinforcing effect.

Proposals of using a diene rubber having introduced therein a substituent exhibiting an improved affinity to the diene rubber have heretofore been made to enhance the affinity of silica to the diene rubber. For example, a diene rubber having introduced therein a tertiary amino group, which is prepared by an emulsion polymerization procedure (Japanese Unexamined Patent Publication (abbreviated to "JP-A") H1-101344), and a diene rubber having introduced therein an alkylsilyl group (JP-A H1-188501), a halogenated silyl group (JP-A H5-230286) or an amino group having a substituent or substituents (JP-A S64-22940), which are prepared by an anion polymerization procedure, were proposed. However, the diene rubbers having incorporated therein these substituents exhibit heat build-up, tensile strength and abrasion resistance, which are not improved to the desired extent.

A rubber composition exhibiting an enhanced green strength was proposed in Japanese Examined Patent Publication (abbreviated to "JP-B") S58-41282 wherein a rubber composition is disclosed, which comprises a product prepared by reacting a butadiene-styrene copolymer having a tertiary amino group in the main chain with a dihalide such as 4,4'-bis(bromoacetyl)diphenylmethane (hereinafter abbreviated to "BADM"), and carbon black. If this product is incorporated with silica, the tensile strength is improved to a certain extent, but, the effect of reducing the heat build-up, intended by the incorporation of silica, is not sufficient and the abrasion resistance and other properties also are not high.

DISCLOSURE OF INVENTION

An object of the present invention is to provide a diene rubber and a process for preparing the diene rubber, which rubber is characterized as, when silica is incorporated therein as a reinforcing agent, exhibiting a well reduced heat build-up, which is an index of a well reduced rolling resistance, and having tensile strength and abrasion resistance, which are approximately equal to those of the diene rubber composition containing carbon black.

Another object is to provide a rubber composition exhibiting a well reduced heat build-up and excellent tensile strength and abrasion resistance.

To solve the above-mentioned problems of the heretofore proposed rubber compositions, the inventors conducted extensive researches and found that a rubber composition exhibiting a well reduced heat build-up and excellent tensile strength and abrasion resistance can be obtained by blending a rubber ingredient comprising a specific quaternary ammonium group-containing diene rubber with silica, and further that this quaternary ammonium group-containing diene rubber can be industrially beneficially obtained by (1) a process wherein a diene is polymerized by using an organic active metal as an initiator to give a polymer having an active metal bound to a terminal of its polymer chain; the polymer is reacted with a modifier to introduce a tertiary amino group into the polymer chain terminal; and then the polymer is reacted with an alkylating agent, or (2) a process wherein a diene is polymerized by using an organic active metal amide as an initiator to give a polymer having a tertiary amino group at a terminal of its polymer chain; and then the polymer is reacted with an alkylating agent.

In one aspect of the present invention, there is provided a diene rubber (i) comprised of a conjugated diene homopolymer or a conjugated diene-aromatic vinyl copolymer; said homopolymer or copolymer having on at least one end of its polymer chain a quaternary ammonium group to which four carbon atoms have been bound, and containing 0 to 60% by weight of aromatic vinyl units; at least 10% by weight of the bound conjugated diene units being a vinyl bond; and said homopolymer or copolymer further having a weight average molecular weight (Mw) of 100,000 to 2,000,000.

In another aspect of the present invention, there is provided a diene rubber mixture comprising the above-mentioned diene rubber (i) and other diene rubber (ii).

In still another aspect of the present invention, there is provided a process for producing a diene rubber characterized in that a conjugated diene is polymerized alone or a conjugated diene and an aromatic vinyl are copolymerized in a hydrocarbon solvent by using an organic active metal as an initiator, to give a homopolymer or copolymer, having an active metal bound to a terminal of the polymer chain thereof; the homopolymer or copolymer is allowed to react with a modifier (Y) to introduce a tertiary amino group into the polymer chain terminal; and then the homopolymer or copolymer is allowed to react with an alkylating agent.

In a further aspect of the present invention, there is provided a process for producing a diene rubber characterized in that a conjugated diene is polymerized alone or a conjugated diene and an aromatic vinyl are copolymerized in a hydrocarbon solvent by using an organic active metal amide as an initiator, to give a homopolymer or copolymer; and then the homopolymer or copolymer is allowed to react with an alkylating agent.

In a further aspect of the present invention, there is provided a process for producing a diene rubber characterized in that a conjugated diene is polymerized alone or a conjugated diene and an aromatic vinyl are copolymerized in a hydrocarbon solvent by using an organic active metal amide as an initiator, to give a homopolymer or copolymer, having an active metal bound to a terminal of the polymer chain thereof; the homopolymer or copolymer is allowed to react with a polyfunctional coupling agent and/or a modifier (X); and then the homopolymer or copolymer is allowed to react with an alkylating agent.

In a further aspect of the present invention, there is provided a rubber composition comprising a rubber ingredient and a reinforcing agent; said rubber ingredient comprising the above-mentioned diene rubber (1) or the above-mentioned diene rubber mixture.

BEST MODE FOR CARRYING OUT THE INVENTION

Quaternary Ammonium Group-Containing Diene Rubber (i)

The quaternary ammonium group-containing diene rubber (i) of the present invention is comprised of a conjugated diene homopolymer or a conjugated diene/aromatic vinyl copolymer, which has on at least one end of its polymer chain a quaternary ammonium group to which four carbon atoms have been bound.

As specific examples of the conjugated diene, there can be mentioned 1,3-butadiene, 2-methyl-1,3-butadiene, 2,3-dimethyl-1,3-butadiene, 2-chloro-1,3-butadiene and 1,3-pentadiene. Of these, 1,3-butadiene and 2-methyl-1,3-butadiene are preferable. 1,3-Butadiene is most preferable. These conjugated dienes may be used either alone or as a mixture of at least two thereof.

As specific examples of the aromatic vinyl, there can be mentioned styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene and monofluorostyrene. Of these, styrene is preferable. These aromatic vinyls may be used either alone or as a mixture of at least two thereof.

The content of the aromatic vinyl in the homopolymer or copolymer is in the range of 0 to 60% by weight, and can suitably be chosen depending upon the intended use of the rubber. For example, when a rubber exhibiting an extremely reduced heat build-up is desired, a conjugated diene homopolymer is usually used. When a rubber having highly balanced heat build-up and wet skid resistance is desired, a conjugated diene/aromatic vinyl copolymer is usually used which contains 40 to 95% by weight, preferably 50 to 90% by weight and more preferably 55 to 85% by weight of conjugated diene units and 60 to 5% by weight, preferably 50 to 10% by weight and more preferably 45 to 15% by weight of aromatic vinyl units. When the content of an aromatic vinyl is too large, the heat build-up cannot be reduced to the desired extent.

The quaternary ammonium group is not particularly limited provided that four carbon atoms are bound thereto, and includes, for example, those which are represented by the general formula (1):

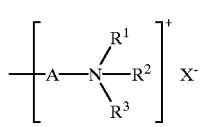

(1)

wherein each of $R^1$, $R^2$ and $R^3$ is an alkyl group, an aryl group or an aralkyl group, A is an alkylene group, an arylene group, an arylene-alkylene group, an alkylene-arylene group or a connecting group represented by the formula —C(=O)—M—$R^4$— (wherein M is an oxy group or an NH group, $R^4$ is an alkylene group, an arylene group, an arylene-alkylene group or an alkylene-arylene group), and X is a halogen atom. A quaternary ammonium group not having four carbon atoms bound thereto, for example, a quaternary ammonium group of the type >C=$N^+$<, is not preferable because a rubber having the intended good properties is difficult to obtain.

$R^1$, $R^2$ and $R^3$ in the general formula (1) independently represent an alkyl group, an aryl group or an aralkyl group, preferably an alkyl group. As specific examples of the alkyl group, there can be mentioned methyl, ethyl, propyl, isopropyl, n-butyl, sec-butyl, tert-butyl, n-pentyl, isopentyl, n-hexyl, n-octyl and n-decyl groups. Of these, lower alkyl groups such as methyl, ethyl, propyl, isopropyl, n-butyl, sec-butyl, tert-butyl, n-pentyl, isopentyl and n-hexyl groups are preferable. A methyl group and an ethyl group are especially preferable. As specific examples of the aryl group, there can be mentioned a phenyl group which is unsubstituted or has a lower alkyl substituent. As specific examples of the aralkyl group, there can be mentioned a benzyl group, a phenethyl group and a benzyl group having a lower alkyl substituent.

"A" in the general formula (1) represents an alkylene group, an arylene group, an arylene-alkylene group, an alkylene-arylene group or a connecting group represented by the formula —C(=O)—M—$R^4$— (wherein M is an oxy group or an NH group, $R^4$ is an alkylene group, an arylene group, an arylene-alkylene group or an alkylene-arylene group).

As specific examples of the alkylene group in "A", there can be mentioned methylene, ethylene, n-propylene, isopropylene, n-butylene, isobutylene, sec-butylene, tert-butylene and n-hexylene groups. As specific examples of the arylene group in "A", there can be mentioned 1,2-phenylene, 1,3-phenylene and 1,4-phenylene groups. Part of the hydrogen atoms in these arylene groups may be substituted by a lower alkyl group. As specific examples of the alkylene-arylene group and the arylenealkylene group, there can be mentioned connecting groups which are a combination of a lower alkylene group such as a methylene, ethylene, propylene, isopropylene or butylene group with an arylene group such as an unsubstituted phenylene group or a phenylene group having a lower alkyl substituent.

As specific examples of the carbonyloxyalkylene or carbonyloxyarylene group represented by the general formula —C(=O)—O—$R^4$—, there can be mentioned carbonyloxyalkylene groups such as carbonyloxymethylene, carbonyloxyethylene, carbonyloxy-n-propylene, carbonyloxy-isopropylene, carbonyloxy-n-butylene, carbonyloxy-tert-butylene, carbonyloxy-n-hexylene and carbonyloxy-n-octylene groups, and carbonyloxyarylene groups such as carbonyloxy-1,2-phenylene, carbonyloxy-1,3-phenylene and carbonyloxy-1,4-phenylene groups. Of these, carbonyloxyethylene, carbonyloxy-n-propylene and carbonyloxy-n-butylene groups are preferable.

As specific examples of the carbonyliminoalkylene or carbonyliminoarylene group represented by the general formula —C(=O)—NH—$R^4$—, there can be mentioned carbonyliminoalkylene groups such as carbonyliminomethylene, carbonyliminoethylene, carbonylimino-n-propylene, carbonyliminoisopropylene, carbonylimino-n-butylene, carbonylimino-tert-butylene, carbonylimino-n-hexylene and carbonylimino-n-octylene groups; and carbonyliminoarylene groups such as carbonylimino-1,2-phenylene, carbonylimino-1,3-phenylene and carbonylimino-1,4-phenylene groups.

$R^1$ and "A" may form together a hetero ring such as, for example, a pyrrolidinium ring and a piperidinium ring.

"X" in the general formula (1) represents a halogen atom such as, for example, chlorine, bromine, iodine and fluorine atoms. Of these, chlorine, bromine and iodine atoms are preferable.

The bound conjugated diene units in the diene rubber (i) of the present invention contains at least 10% by weight, preferably 10 to 90% by weight, more preferably 30 to 85% by weight and most preferably 50 to 80% by weight, of a vinyl bond (which includes 1,2-vinyl bond and 3,4-vinyl bond). If the content of a vinyl bond in the bound conjugated diene units is too small, the rubber vulcanizate has a poor abrasion resistance. In contrast, if the content of a vinyl bond in the bound conjugated diene units is too large, the conjugated diene/aromatic vinyl copolymer is difficult to produce. The remainder of the bound conjugated diene units is a 1,4-bond which may be either 1,4-cis bond or 1,4-trans bond.

When the diene rubber (i) of the present invention is comprised of the conjugated diene/aromatic vinyl copolymer, the distribution of aromatic vinyl units in the polymer chain of the copolymer is not particularly limited. But, for obtaining a rubber vulcanizate having highly balanced characteristics such as heat build-up, abrasion resistance and wet-skid resistance, the content of an isolated short chain composed of one aromatic vinyl unit in the copolymer is usually at least 40% by weight, preferably at least 60% by weight and more preferably 75% by weight, based on the weight of the total bound aromatic vinyl units, and the content of a long chain composed of at least eight connected aromatic vinyl units in the copolymer is usually not larger than 5% by weight, preferably not larger than 2.5% by weight and more preferably not larger than 1.5% by weight, based on the weight of the total bound aromatic vinyl units.

The diene rubber (i) of the present invention has a weight average molecular weight (Mw) of 100,000 to 2,000,000, preferably 150,000 to 1,500,000 and more preferably 200,000 to 1,200,000, as measured by gel permeation chromatography and expressed in terms of that of polystyrene. If the weight average molecular weight of the diene rubber is too small, the rubber vulcanizate is not satisfactory in heat build-up and abrasion resistance. In contrast, if the weight average molecular weight of the diene rubber is too large, the rubber vulcanizate has a poor processability.

The process for producing the diene rubber (i) of the present invention is not particularly limited. For example, there can be adopted a process ("process a") wherein a conjugated diene is polymerized alone or a conjugated diene and an aromatic vinyl are copolymerized in a hydrocarbon solvent by using an organic active metal as an initiator, to give a homopolymer or copolymer, having an active metal bound to a terminal of the polymer chain thereof; the homopolymer or copolymer is allowed to react with a modifier (Y) to introduce a tertiary amino group into the polymer chain terminal; and then the homopolymer or copolymer is allowed to react with an alkylating agent; and a process ("process b") wherein a conjugated diene is polymerized alone or a conjugated diene and an aromatic vinyl are copolymerized in a hydrocarbon solvent by using an organic active metal amide as an initiator, to give a homopolymer or copolymer; and then the homopolymer or copolymer is allowed to react with an alkylating agent.

The organic active metal used in "process a" includes those which are generally used in an anionic polymerization. The organic active metal includes, for example, organic alkali metals, organic alkaline earth metals and organic acid lanthanoid metals. Of these, organic alkali metals are preferable.

As specific examples of the organic alkali metals, there can be mentioned mono-organolithium compounds such as n-butyllithium, sec-butyllithium, t-butyllithium, hexyllithium, phenyllithium and stilbenelithium; polyfunctional organolithium compounds such as dilithiomethane, 1,4-dilithiobutane, 1,4-dilithio-2-ethylcyclohexane and 1,3,5-trilithiobenzene; and sodium naphthalene and potassium naphthalene. Of these, organolithium compounds are preferable. Mono-organolithium compounds are especially preferable.

As specific examples of the organic alkaline earth metals, there can be mentioned n-butylmagnesium bromide, n-hexylmagnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate and ethylbarium.

As a specific example of the organic acid lanthanoid metals, there can be mentioned a composite catalyst composed of neodymium versatate/triethylaluminum hydride/ethylaluminum sesquichloride as described in JP-B S63-64444.

The organic active metals may be used either alone or as a combination of at least two thereof. The amount of the organic active metal varies depending upon the particular molecular weight of the polymer, and usually in the range of 0.01 to 20 milli-moles, preferably 0.05 to 15 milli-moles and more preferably 0.1 to 10 milli-moles, per 100 gram of the monomer.

The polymerization reaction using the organic active metal as an initiator is conduced in a hydrocarbon solvent which does no destroy the initiator. The hydrocarbon solvent used is not particularly limited provided that it can be used in an ordinary solution polymerization. As specific examples of the hydrocarbon solvent, there can be mentioned aliphatic hydrocarbons such as n-butane, n-pentane, iso-pentane, n-hexane, n-heptane and iso-octane; alicyclic hydrocarbons such as cyclopentane, cyclohexane and methylcyclopentane; and aromatic hydrocarbons such as benzene and toluene. Of these, n-hexane, cyclohexane and toluene are preferable. According to the need, unsaturated hydrocarbons having a low polymerizability such as 1-butene, cis-2-butene and 2-hexene can be used. These hydrocarbon solvents may be used either alone or as a combination of at least two thereof. The amount of the hydrocarbon solvent is usually such that the concentration of monomer is 1 to 30% by weight.

To control the microstructure of conjugated diene units or the distribution of conjugated diene units and aromatic vinyl units in the copolymer chain, a polar compound can be used at the polymerization step. The polar compound used is not particularly limited provided that it is used in the conventional anionic polymerization using an organic active metal as an initiator. The polar compound includes, for example, ethers; tertiary amines; alkali metal alkoxides such as potassium-t-amyloxide and potassium-t-butyloxide; and phosphines such as triphenylphosphine. Of these, tertiary amines and ethers are preferable. Tertiary amines and diethers having two oxy groups are especially preferable.

As specific examples of the tertiary amines, there can be mentioned tetramethylethylenediamine, trimethylamine, triethylamine, pyridine and quinacridine. Of these, tetramethylethylenediamine is preferable.

The ethers used are classified into monoethers having one ether linkage in the molecule, diethers having two ether linkages in the molecule and polyethers having at least three either linkages in the molecule. Of these, diethers are most preferable. The number of carbon atoms in the ether is not particularly limited, but is usually in the range of 2 to 100, preferably 4 to 50, more preferably 4 to 20 and most preferably 4 to 15.

As specific examples of monoethers, there can be mentioned aliphatic monoethers such as dimethyl ether, diethyl ethers, diisopropyl ether, dibutyl ether, diamyl ether, diisoamyl ether, methyl ethyl ether, methyl propyl ether, methyl isopropyl ether, methyl butyl ether, methyl isoamyl ether, ethyl propyl ether, ethyl isopropyl ether and ethyl isobutyl ether; aromatic monoethers such as anisole, phenetole, diphenyl ether and dibenzyl ether; and cyclic monoethers such as tetrahydrofuran and tetrahydropyran. Of these, aliphatic monoethers and cyclic monoethers are preferable.

The diethers include, for example, alkylene glycol diethers and cyclic diethers. Alkylene glycol diethers are preferable. The number of carbon atoms in the diether is not particularly limited, but is usually in the range of 4 to 30, preferably 4 to 20 and more preferably 4 to 15.

The alkylene glycol diethers include, for example, alkylene glycol dialkyl ethers, alkylene glycol alkyl aryl ethers, alkylene glycol diaryl ethers and alkylene glycol diaralkyl ethers. Of these, alkylene glycol dialkyl ethers are preferable.

As specific examples of preferable alkylene glycol diethers, there can be mentioned alkylene glycol dialkyl ethers such as ethylene glycol dimethyl ether, ethylene glycol methyl ethyl ether, ethylene glycol diethyl ether, ethylene glycol dipropyl ether, ethylene glycol dibutyl ether, ethylene glycol diamyl ether, ethylene glycol dioctyl ether, propylene glycol dimethyl ether, propylene glycol diethyl ether, propylene glycol dibutyl ether, isopropylene glycol dimethyl ether, isopropylene glycol diethyl ether, butylene glycol dimethyl ether, butylene glycol diethyl ether and butylene glycol dibutyl ether; alkylene glycol alkyl aryl ethers such as ethylene glycol methyl phenyl ether; and alkylene glycol diaryl ethers such as ethylene glycol dibenzyl ether. Of these, ethylene glycol dimethyl ether, ethylene glycol methyl ethyl ether, ethylene glycol diethyl ether, ethylene glycol dipropyl ether, ethylene glycol dibutyl ether, ethylene glycol diamyl ether, propylene glycol dimethyl ether, propylene glycol diethyl ether and propylene glycol dibutyl ether are especially preferable. Ethylene glycol dimethyl ether, ethylene glycol methyl ethyl ether, ethylene glycol diethyl ether, ethylene glycol dipropyl ether, ethylene glycol dibutyl ether, ethylene glycol butyl t-butyl ether and ethylene glycol diamyl ether are most preferable.

As specific examples of the cyclic ethers, there can be mentioned dioxane, 1,10-phenanthroline, dioxolane alkanes described in U.S. Pat. No. 4,429,091, such as bis(2-oxolanyl)methane 2,2-bis(2-oxolanyl)propane, 1,1-bis(2-oxolanyl)ethane and 2,2-bis(5-methyl-2-oxolanyl)propane. Of these, dioxane and dioxolane alkanes are preferable.

The polyethers include, for example, oligo-oxyalkylene glycol dialkyl ethers, oxolanyldioxanes, oxolanyldioxolanes and crown ethers.

As specific examples of the oligo-oxyalkylene glycol dialkyl ethers, there can be mentioned oligo-oxyethylene glycol dialkyl ethers such as diethylene glycol dimethyl ether, diethylene glycol methyl ethyl ether, diethylene glycol diethyl ether, diethylene glycol dibutyl ether, diethylene glycol dihexyl ether, triethylene glycol dimethyl ether, triethylene glycol dipropyl ether, triethylene glycol dibutyl ether and tetraethylene glycol diethyl ether; oligo-oxypropylene glycol dialkyl ethers such as dipropylene glycol dimethyl ether, dipropylene glycol diethyl ether, dipropylene glycol dipropyl ether and dipropylene glycol diamyl ether, and oligo-oxybutylene glycol dialkyl ethers such as dibutylene glycol dimethyl ether. Of these, oligo-oxyethylene glycol dialkyl ethers are preferable. Diethylene glycol dimethyl ether, diethylene glycol diethyl ether, diethylene glycol dibutyl ether, triethylene glycol dimethyl ether, triethylene glycol dibutyl ether and tetraethylene glycol diethyl ether are especially preferable.

As specific examples of the polyoxyalkylene glycol dialkyl ethers, there can be mentioned polyoxyethylene glycol dialkyl ethers such as polyoxyethylene glycol dimethyl ether, polyoxyethylene glycol diethyl ether, polyoxyethylene glycol diisopropyl ether, polyoxyethylene glycol dibutyl ether and polyoxyethylene glycol dioctyl ether; polyoxypropylene glycol dialkyl ethers such as polyoxypropylene glycol dimethyl ether and polyoxypropylene glycol diethyl ether; and polyoxybutylene glycol dialkyl ethers such as polyoxybutylene glycol dimethyl ether.

The oxolanyldioxanes and oxolanyldioxolanes include, for example, those which are described in JP-B H7-74245, and, as specific examples thereof, there can be mentioned 2-(2-oxolanyl)dioxane, 2-(2-oxolanyl)-4,4,6-trimethyldioxane, 2-(5-methyl-2-oxolanyl)-4,4,6-trimethyldioxane, 2-(2-oxolanyl-5,5-dimethyldioxane, 2-(2-oxolanyl)dioxolane, 2-(2-oxolanyl)-4-t-butyldioxolane, 2-(2-oxolanyl)-4,5-dimethyldioxolane and 2-(2-oxolanyl)-4,4,5,5-tetramethyldioxolane.

As specific examples of the crown ethers, there can be mentioned 18-crown-6-ether, 15-crown-5-ether, 12-crown-4-ether, dibenzo-18-crown ether, dibenzo-24-crown-8-ether, dicyclohexano-18-crown-6-ether and 4'-nitrosobenzo-15-crown-5-ether.

The above mentioned polar compounds may be used either alone or as a combination of at least two thereof. The amount of the polar compound is usually in the range of 0 to 200 moles, preferably 0.1 to 100 moles, more preferably 0.5 to 50 moles and most preferably 0.8 to 20 moles, per mole of the initiator (i.e., an organic active metal or an organic active metal amide).

For the polymerization, the conjugated diene is polymerized alone or the conjugated diene and the aromatic vinyl are copolymerized. Where the conjugated diene and the aromatic vinyl are copolymerized, the proportion of the respective monomers is such that the amount of the conjugated diene is usually 40 to 95% by weight, preferably 50 to 90% by weight and more preferably 55 to 85% by weight, and the amount of the aromatic vinyl is usually 60 to 5% by weight, preferably 50 to 10% by weight and more preferably 45 to 15% by weight, based on the weight of the total monomers.

The polymerization is conducted usually at a temperature of −78 to 150° C. in a batchwise or continuous manner. When the aromatic vinyl is copolymerized, the proportion of the aromatic vinyl to the conjugated diene in the polymerization system is preferably controlled so that the concentration of the aromatic vinyl falls within a specific range, for example, by feeding continuously or intermittently the conjugated diene alone or a mixture of the conjugated diene and the aromatic vinyl as described in JP-A S59-140211 and JP-A S56-143209, whereby the randomness of the aromatic vinyl can be enhanced.

The kind of the produced polymers include, for example, polybutadiene, polyisoprene, a butadiene-isoprene copolymer, a styrene-butadiene copolymer, a styrene-isoprene copolymer and a styrene-butadiene-isoprene copolymer. Thus, a polymer having an active metal bound to at least one terminal of the polymer chain (hereinafter referred to as "active polymer") can be obtained.

The modifier (Y) to be allowed to react with the active polymer to introduce a tertiary amino group into the polymer terminal is known, and includes those which are described, for example, in JP-A S59-191705, JP-A S60-137913, JP-A S62-86074, JP-A S62-109801, JP-A S62-149708 and JP-A S64-22940.

Preferable examples of the modifier (Y) are compounds (Y–α) having in the molecule a functional group capable of reacting with the active metal, and a tertiary amino group, and compounds (Y–β) having in the molecule a nitrogen-carbon double bond, said nitrogen having a substituent or substituents.

The functional group of the modifier (Y–α) is not particularly limited provided that it is capable of reacting with the above-mentioned active polymer, and includes, for example, a carbon—carbon unsaturated group such as a vinyl group; a halogen atom; and a carbonyl group. The tertiary amino group of the modifier (Y–α) also is not particularly limited and includes, for example, those which are represented by the general formula (2):

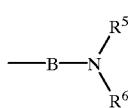

(2)

wherein each of $R^5$ and $R^6$ is an alkyl group, an aryl group or an aralkyl group, B is an alkylene group, an arylene group, an arylene-alkylene group, an alkylene-arylene group, or a connecting group represented by the formula

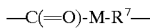

—C(=O)-M-R$^7$—

(wherein M is an oxy group or an NH group, $R^7$ is an alkylene group, an arylene group, an arylene-alkylene group or an alkylene-arylene group), and $R^5$ and B may form together a hetero ring. As specific examples of $R^5$ and $R^6$ in formula (2), there can be mentioned those recited as specific examples of $R^1$ in formula (1). As specific examples of "B" in formula (2), there fan be mentioned those which are recited as specific examples of "A" in formula (1).

As examples of the modifier (Y–α), there can be mentioned a compound having a vinyl group and a tertiary amino group in the molecule, and a compound having a carbonyl group and a tertiary amino group in the molecule.

As examples of the compound having a vinyl group and a tertiary amino group in the molecule, there can be mentioned N,N-disubstituted aminoalkyl acrylate, N,N-disubstituted aminoalkyl methacrylates, N,N-disubstituted aminoalkyl-acrylamides, N,N-disubstituted aminoalkyl-methacrylamides, and N,N-disubstituted amino-aromatic vinyl compounds.

As specific examples of the N,N-disubstituted aminoalkyl acrylates and methacrylates, there can be mentioned acrylic acid esters and methacrylic acid esters, such as N,N-dimethylaminomethyl acrylate, N,N-dimethylaminomethyl methacrylate, N-methyl-N-ethylaminomethyl acrylate, N-methyl-N-ethylaminomethyl methacrylate, N,N-dimethylaminoethyl acrylate, N,N-dimethylaminoethyl methacrylate, N,N-dimethylaminopropyl acrylate, N-N-dimethylaminopropyl methacrylate, N,N-dimethylaminobutyl acrylate, N,N-dimethylaminobutyl methacrylate, N,N-diethylaminoethyl acrylate, N,N-diethylaminoethyl methacrylate, N,N-diethylaminopropyl acrylate, N,N-diethylaminopropyl methacrylate, N,N-diethylaminobutyl acrylate, N,N-diethylaminobutyl methacrylate, N-methyl-N-ethylaminoethyl acrylate, N-methyl-N-ethylaminoethyl methacrylate, N,N-dipropylaminoethyl acrylate, N,N-dipropylaminoethyl methacrylate, N,N-dibutylaminoethyl acrylate, N,N-dibutylaminoethyl methacrylate, N,N-dibutylaminopropyl acrylate, N,N-dibutylaminopropyl methacrylate, N,N-dibutylaminobutyl acrylate, N,N-dibutylaminobutyl methacrylate, N,N-dihexylaminoethyl acrylate, N,N-dihexylaminoethyl methacrylate, N,N-dioctylaminoethyl acrylate, N-N-dioctylaminoethyl methacrylate and acryloyl morpholine. Of these, N,N-dimethylaminoethyl acrylate, N,N-dimethylaminoethyl methacrylate, N,N-diethylaminoethyl acrylate, N,N-diethylaminoethyl methacrylate, N,N-dipropylaminoethyl acrylate, N,N-dipropylaminoethyl methacrylate, N,N-dioctylaminoethyl acrylate, N,N-dioctylaminoethyl methacrylate, N-methyl-N-ethylaminoethyl acrylate and N-methyl-N-ethylaminoethyl methacrylate.

As specific examples of the N,N-disubstituted aminoalkyl-acrylamides and -methacrylamides, there can be mentioned N,N-dimethylaminomethylacrylamide N,N-dimethylaminomethylmethacrylamide, N-methyl-N-ethylaminomethylacrylamide, N-methyl-N-ethylaminomethylmethacrylamide, N,N-dimethylaminoethylacrylamide, N,N-dimethylaminoethylmethacrylamide, N,N-dimethylaminopropylacrylamide, N,N-dimethylaminopropylmethacrylamide, N,N-dimethylaminobutylacrylamide, N,N-dimethylaminobutylmethacrylamide, N,N-diethylaminoethylacrylamide, N,N-diethylaminoethylmethacrylamide, N,N-diethylaminopropylacrylamide, N,N-diethylaminopropylmethacrylamide, N,N-diethylaminobutylacrylamide, N,N-diethylaminobutylmethacrylamide, N-methyl-N-ethylaminoethylacrylamide, N-methyl-N-ethylaminoethylmethacrylamide, N,N-dipropylaminoethylacrylamide, N,N-dipropylaminoethylmethacrylamide, N,N-dibutylaminoethylacrylamide, N,N-dibutylaminoethylmethacrylamide, N,N-dibutylaminopropylacrylamide, N,N-dibutylaminopropylmethacrylamide, N,N-dibutylaminobutylacrylamide, N,N-dibutylaminobutylmethacrylamide, N,N-dihexylaminoethylacrylamide, N,N-dihexylaminoethylmethacrylamide, N,N-dihexylaminopropylacrylamide, N,N-dihexylaminopropylmethacrylamide, N,N-dioctylaminopropylacrylamide and N,N-dioctylaminopropylmethacrylamide. Of these, N,N-dimethylaminopropylacrylamide, N-N-dimethylaminopropylmethacrylamide, N,N-diethylaminopropylacrylamide, N,N-diethylaminopropylmethacrylamide, N,N-dioctylaminopropylacrylamide and N,N-dioctylaminopropylmethacrylamide are preferable.

As specific examples of the N,N-disubstituted amino-aromatic vinyl compound, there can be mentioned styrene derivatives such as N,N-dimethylaminoethylstyrene, N-methyl-N-ethylaminoethylstyrene, N,N-diethylaminoethylstyrene, N,N-dipropylaminoethylstyrene and N,N-dioctylaminoethylstyrene.

In the compound having a carbonyl group and a tertiary amino group in the molecule, the carbonyl group and the tertiary amino group may be either adjacent to or apart from each other. The compound having a carbonyl group and a tertiary amino group which are adjacent to each other includes, for example, N-substituted amides, N-substituted imides, N-substituted ureas and N-substituted isocyanuric acids. These N-substituted compounds are preferably in a cyclic form. The compound having a carbonyl group and a tertiary amino group which are apart from each other includes, for example, N-substituted aminoketones and N-substituted aminoaldehydes. Of these, N-substituted aminoketones are preferable.

As specific examples of the N-substituted cyclic amides, there can be mentioned N-methyl-β-propiolactam, N-phenyl-β-propiolactam, N-methyl-2-pyrrolidone, N-vinyl-2-pyrrolidone, N-phenyl-2-pyrrolidone, N-b-butyl-2-pyrrolidone, M-methyl-5-methyl-2-pyrrolidone, N-methyl-2-piperidone, N-vinyl-2-piperidone, N-phenyl-2-piperidone, N-methyl-ε-caprolactam, N-phenyl-ε-caprolactam, N-methyl-ω-laurylolactam and N-methyl-ω-laurylolactam. Of these, N-methyl-2-pyrrolidone, N-vinyl-2-pyrrolidone, N-phenyl-2-pyrrolidone, N-methyl-2-piperidone, N-vinyl-2-piperidone, N-methyl-ε-caprolactam and N-phenyl-ε-caprolactam are preferable.

As specific examples of the N-substituted cyclic ureas, there can be mentioned 1,3-dimethylethyleneurea, 1,3-divinylethyleneurea, 1,3-diethyl-2-imidazolidinone and 1-methyl-3-ethyl-2-imidazolidinone. Of these, 1,3-dimethylethyleneurea and 1,3-divinylethyleneurea are preferable.

As specific examples of the N-substituted aminoketones, there can be mentioned 4-N,N-dimethylaminoacetophenone, 4-N-methyl-N-ethylaminoacetophenone, 4-N,N-diethylaminoacetophenone, 1,3-bis(diphenylamino)-2-propanone, 1,7-bis(methylethylamino)4-heptanone, 4-N,N-dimethylaminobenzophenone, 4-N,N-di-t-butylaminobenzophenone, 4-N,N-diphenylaminobenzophenone, 4,4'-bis(dimethylamino)benzophenone, 4,4'-bis(diethylamino)benzophenone and 4,4'-bis(diphenylamino)benzophenone. Of these, 4,4'-bis(dimethylamino)benzophenone, 4,4'-bis(diethylamino)benzophenone and 4,4'-bis(diphenylamino)benzophenone are especially preferable.

As specific examples of the N-substituted aminoaldehydes, there can be mentioned 4-N,N-dimethylaminobenzaldehyde, 4-N,N-diphenylaminobenzaldehyde and 4-N,N-divinyl aminobenzaldehyde.

The modifier (Y-β), i.e., a compound having a nitrogen-carbon double bond in the molecule, said nitrogen having a substituent or substituents, includes, for example, N-substituted carbodiimides and Schiff bases.

As specific examples of the N-substituted carbodiimides, there can be mentioned dimethylcarbodiimide, diethylcarbodiimide, dipropylcarbodiimide, dibutylcarbodiimide, dihexylcarbodiimide, dicyclohexylcarbodiimide, dibenzylcarbodiimide, diphenylcarbodiimide, methylpropylcarbodiimide, butylcyclohexylcarbodiimide, ethylbenzylcarbodiimide, propylphenylcarbodiimide and phenylbenzylcarbodiimide. Of these, dicyclohexylcarbodiimide and diphenylcarbodiimide are preferable.

As specific examples of the Schiff bases, there can be mentioned N-ethylethylideneimine, N-methylbenzylideneimine, N-hexylcinnamylideneimine, N-decyl-2-ethyl-1,2-diphenylbutylideneimine, N-phenylbenzylideneimine, N-dodecylcyclohexaneimine, N-propy-12,5-cyclohexadieneimine and N-methyl-1-naphthaleneimine.

The modifier (Y) may be used either alone or as a combination of at least two thereof. The amount of the modifier (Y) varies depending upon the particular properties required for the diene rubber, and is usually in the range of 0.1 to 50 equivalent, preferably 0.2 to 20 equivalent and more preferably 0.3 to 10 equivalent, based on the organic active metal. The amount of the modifier (Y) used for the preparation of the quaternary ammonium group-containing diene rubber (i) of the present invention is usually in the range of 1 to 50 equivalent, preferably 1 to 20 equivalent and more preferably 1 to 10 equivalent, based on the organic active metal. The intended effect by the inclusion of a quaternary ammonium group is large, and therefore, the purpose of the invention can be attained by incorporating only a small amount of the modifier. In this case [where a diene rubber (iii) comprising a quaternary ammonium group-containing diene rubber (i) and an unmodified diene rubber (ii-i) is produced], the amount of the modifier (Y) is usually in the range of 0.1 to 0.9 equivalent, preferably 0.2 to 0.8 equivalent and more preferably 0.3 to 0.7 equivalent, based on the organic active metal.

The modifying reaction can be conducted by allowing the above-mentioned active polymer having the bound active metal in the molecule to contact the modifier (Y). When the active polymer is prepared by the polymerization reaction, a predetermined amount of the modifier (Y) is usually incorporated into the polymerization mixture containing the active polymer before the stop of polymerization to effect the modifying reaction. The temperature and time for the modifying reaction can be varied in a broad range, but the modifying reaction is conducted generally in the range of room temperature to 120° C. for a period of several seconds to several hours. The percentage of modification can be suitably chosen within the range of 10 to 100%. The percentage of modification can be determined by measuring the absorption intensity by using a differential refractometer (RI) of GPC and an ultraviolet-visible light spectrophotometer (UV) and calculating the absorption intensity ratio (UV/RI), and determining the modification (%) from the previously drawn caribration curve.

The organic active metal amide used in the above-mentioned process "b" may be either previously prepared by allowing the organic active metal to react with a secondary amine, or prepared in the polymerization system wherein the organic active metal is incorporated in the presence of at least part of the monomers and a secondary amine as described in JP-A H6-199921.

The secondary amine used includes, for example, aliphatic secondary amines, aromatic secondary amines and cyclic imines. Preferably the secondary amine is an aliphatic secondary amine or a cyclic imine.

As specific examples of the aliphatic secondary amines, there can be mentioned dimethylamine, methylethylamine, methylpropylamine, methylbutylamine, methylamylamine, amylhexylamine, diethylamine, ethylpropylamine, ethylbutylamine, ethylhexylamine, dipropylamine, diisopropylamine, propylbutylamine, dibutylamine, diamylamine, dihexylamine, diheptylamine, dioctylamine, methylcyclopentylamine, ethylclopentylamine, methylcyclohexylamine, dicyclopentylamine and dicyclohexylamine. Of these, dimethylamine, methylethylamine, diethylamine, dipropylamine, diisopropylamine, dibutylamine, diamylamine, dihexylamine, diheptylamine and dioctylamine are preferable.

As specific examples of the aromatic secondary amines, there can be mentioned diphenylamine, N-methylaniline, N-ethylaniline, dibenzylamine, N-methylbenzylamine and N-ethylphenetylamine.

As specific examples of the cyclic imines, there can be mentioned aziridine, azetidine, pyrrolidine, piperidine, 2-methylpiperidine, 3-methylpiperidine, 4-methylpiperidine, 3,5-dimethylpiperidine, 2-ethylpiperidine, hexamethyleneimine, heptamethyleneimine, dodecamethyleneimine, coniine, morpholine, oxazine, pyrroline, pyrrole and azepine. Of these, pyrrolidine, piperidine, 3-methylpiperidine, 4-methylpiperidine, 3,5-dimethylpiperidine, 2-ethylpiperidine, hexamethyleneimine and heptamethyleneimine are preferable.

The above-mentioned secondary amine may be used either alone or as a combination of at least two thereof.

When the organic active metal amide is prepared by previously allowing the organic active metal to react with the secondary amine, the amount of the organic active metal amide used is suitably chosen depending upon the particular molecular weight of polymer, but is usually in the range of 0.1 to 30 milli-mole, preferably 0.2 to 15 milli-mole and more preferably 0.3 to 10 milli-mole, based on 100 g of the monomers.

When the organic active metal amide is prepared by incorporating the organic active metal and the secondary amine into the polymerization system where the organic active metal amide is produced, the amount of the organic active metal amide used is suitably chosen depending upon the particular molecular weight of polymer, but is usually in the range of 0.1 to 30 milli-mole, preferably 0.2 to 15 milli-mole and more preferably 0.3 to 10 milli-mole, based on 100 g of the monomers. In this case, the amount of the secondary amine is usually in the range of 0.5 to 2 equivalent, preferably 0.8 to 1.5 equivalent and more preferably 1 to 1.2 equivalent, based on the organic active metal.

The polymerization reaction in the process "b" can be conducted in a conventional manner. For example, a procedure can be employed wherein the organic active metal and the secondary amine are placed in contact with each other in the presence of at least part of the monomers as described in JPA H6-199921. The other polymerization conditions are the same as those employed for the polymerization in the process "a".

In the process "b", the polymer can be allowed to react with the modifier (X) and/or a polyfunctional coupling agent after completion of polymerization. The modifier (X) used may be either the same as the modifier (Y) or the other modifier (Z). The same modifier as the above-mentioned modifier (Y) is used, a polymer having tertiary amino groups introduced into both ends of its polymer chain is obtained.

The modifier (Z) other than the modifier (Y) includes those which are used in conventional anion polymerization. For example, modifiers described in JP-A S59-191705, JP-A S60-137913, JP-A S62-149708 and JP-A S64-22940.

As examples of the modifier (Z), there can be mentioned ketones such as acetone, benzophenone and acetylacetone; aldehydes such as benzaldehyde; epoxy compounds; and cyclic imines having 2 to 3 carbon atoms.

As specific examples of the epoxy compounds, there can be mentioned ethylene oxide, propylene oxide, 1,2-epoxybutane, 1,2-epoxy-iso-butane, 2,3-epoxybutane, 1,2-epoxyhexane, 1,2-epoxyoctane, 1,2-epoxydecane, 1,2-epoxy-tetradecane, 1,2-epoxyhexadecane, 1,2-epoxyoctadecane, 1,2-epoxyeicosane, 1,2-epoxy-2-pentylpropane, 3,4-epoxy-1-butene, 1,2-epoxy-5-hexene, 1,2-epoxy-9-decene, 1,2-epoxy-cyclopentane, 1,2-epoxycyclohexane, 1,2-epoxycyclododecane, 1,2-epoxyethylbenzene, 1,2-epoxy-1-methoxy-2-methylpropane, glycidyl methyl ether, glycidyl ethyl ether, glycidyl isopropyl ether, glycidyl allyl ether, glycidyl phenyl ether and glycidyl butyl ether. Of these, ethylene oxide, propylene oxide, 1,2-epoxybutane, 1,2-epoxy-iso-butane, 2,3-epoxybutane, 1,2-epoxyhexane, 3,4-epoxy-1-butene, 1,2-epoxy-5-hexene, glycidyl methyl ether, glycidyl ethyl ether, glycidyl isopropyl ether, glycidyl allyl ether, glycidyl phenyl ether and glycidyl butyl ether.

As the epoxy compounds, epihalohydrins, i.e., compounds prepared by substituting at least one hydrogen atom in the above-recited epoxy compounds by a halogen atom, can also be used. As specific examples of the epihalohydrin, there can be mentioned epichlorohydrin, epibromohydrin, epiiodohydrin, 2,3-epoxy-1,1,1-trifluoropropane and 1,2-epoxy-1H,1H,2H,3H,3H-heptadecafluoroundecane. Of these, epichlorohydrin and epibromohydrin are preferable.

As examples of the cyclic imines having 2 to 3 carbon atoms, there can be mentioned aziridine compounds having no substituent in the nitrogen, such as ethylene imine and propylene imine.

The modifier (X) may be used either alone or as a combination of at least two thereof. The amount of the modifier (X) and the reaction conditions are the same as those explained for the modifier (Y).

The polyfunctional coupling agent includes, for example, those which are described in JP-A S56-143209, JP-A S56-17362, JP-A S57-55912 and JP-A S58-162605.

As specific examples of the polyfunctional coupling agent, there can be mentioned tin-containing coupling agents such as tin dichloride, tin tetrachloride, tin tetrabromide, monomethyltin trichloride, monoethyltin trichloride, monobutyltin trichloride, monohexyltin trichloride, dimethyltin dichloride, diethyltin dichloride, dibutyltin dichloride, dibutyltin dibromide, tetramethoxytin, tetraethoxytin, tetrabutoxytin and bistrichlorostannyl ethane; silicon-containing coupling agents such as silicon dichloride, silicon dibromide, silicon tetrachloride, silicon tetrabromide, silicon tetraiodide, monomethylsilicon trichloride, monoethylsilicon trichloride, monobutylsilicon trichloride, monohexylsilicon trichloride, monomethylsilicon tribromide, dimethylsilicon dichloride, diethysilicon dichloride, butylsilicon trichloride, dibutylsilicon dichloride, dihexylsilicon dichloride, dimethylsilicon dibromide, tetramethoxysilane, tetraethoxysilane, tetrabutoxysilane, diphenyldimethoxysilane, diphenyldiethoxysilane, monochlorotrimethoxysilane, monobromotrimethoxysilane, dichlorodimethoxysilane, dibromodimethoxysilane, trichloromethoxysilane, tribromomethoxysilane, alkyltripheneoxysilanes and bis-trichlorosilyl ethane; metal halide coupling agents such as lead dichloride and germanium tetrachloride; unsaturated nitrile coupling agents such as ethylacrylonitrile, halogenated hydrocarbon coupling agents such as dichloromethane, dibromomethane, dichloroethane, dibromoethane, dichloropropane, dibromopropane, dibromobenzene, dichlorobenzene, chloroform, tribromomethane, trichloroethane, trichloropropane, tribromopropane, carbon tetrachloride and tetrachloroethane; ester coupling agents such as methyl formate, ethyl formate, methyl acetate, ethyl acetate, propyl acetate, isopropyl acetate, amyl acetate, methyl propionate, ethyl propionate, methyl butyrate, ethyl butyrate, ethyl trimethylacetate, methyl caproate, ethyl caproate, methyl benzoate, ethyl benzoate, dimethyl adipate, diethyl adipate, dimethyl terephthalate, diethyl terephthalate, dimethyl phthalate and dimethyl isophthalate; halide coupling agents such as terephthaloyl dichloride, isophthaloyl dichloride and adipic acid dichloride; and phosphorus-containing coupling agents such as tris-nonylphenyl phosphite, trimethyl phosphite and triethyl phosphite. Of these, tin-containing coupling agents, silicon-containing coupling agents, ester coupling agents and halogenated hydrocarbon coupling agents are preferable. Tin-containing coupling agents and silicon-containing coupling agents are especially preferable.

The polyfunctional coupling agents may be used either alone or as a combination of at least two thereof. The amount of the polyfunctional coupling agents can be suitably chosen depending upon the particular average molecular weight of polymer, the percentage of coupling and the reactivity of coupling agent, but is usually in the range of 0.1 to 10 equivalent, preferably 0.2 to 5 equivalent and more preferably 0.3 to 2 equivalent, based on the organic active metal. The coupling reaction is conducted usually at a temperature of 0° C. to 150° C. for a period of 0.5 to 20 hours. The percentage of coupling can be suitably chosen usually within the range of 10 to 100%. The percentage of coupling can be determined from the areal ratio of the high molecular weight to the low molecular weight as obtained by a differential refractometer on the GPC measurement.

The alkylation reaction can be conducted in a similar manner in the process "a" and the process "b".

The alkylating agent used includes, for example, alkyl nitrates such as methyl nitrate, ethyl nitrate, propyl nitrate and butyl nitrate; potassium alkylsulfates such as potassium methylsulfate and potassium ethylsulfate; dialkylsurfuric acids such as dimethylsulfuric acid and diethylsulfuric acid; alkyl arylsulfonates such as methyl arylsulfonate, ethyl arylsulfonate and propyl arylsulfonate; and monohalides. Of these, monohalides are preferable.

As the monohalides, there can be mentioned, for example, those which are represented by the general formula (3):

$$R^8 X \qquad (3)$$

wherein $R^8$ is a lower alkyl group, an aryl group or an aralkyl; group, and X is a halogen atom. As specific examples of $R^8$ and X in the formula (3), there can be mentioned those which are recited for $R^3$ and X, respectively, in the formula (1), Preferable examples of the monohalide, there can be mentioned alkyl halides such as methyl chloride, methyl bromide, methyl iodide, ethyl chloride, ethyl bromide, ethyl iodide, propyl iodide, butyl iodide, butyl bromide and hexyl iodide; and benzyl halides such as benzyl chloride, benzyl bromide and benzyl iodide. Alkyl halides are preferable. Lower alkyl halides especially preferable, and methyl halide is most preferable. Preferable halogen atoms are chlorine, bromine and iodine atoms, and an iodine atom is especially preferable.

The alkylating agent may be used either alone or as a combination of at least two thereof. The amount of the alkylating agent can be suitably chosen depending upon the intended degree of conversion to the quaternary ammonium group, but is usually in the range of 0.1 to 50 equivalent, preferably 0.2 to 20 equivalent and more preferably 0.3 to 10 equivalent, based on the amount of the tertiary amino group contained in the diene polymer. The amount of the alkylating agent used for the preparation of the quaternary ammonium group-containing diene rubber (i) of the present invention is usually in the range of 1 to 50 equivalent, preferably 1 to 20 equivalent and more preferably 1.2 to 10 equivalent, based on the amount of the tertiary amino group contained in the diene polymer. The intended effect by the inclusion of a quaternary ammonium group in the present invention is large, and therefore, the purpose of the invention can be attained by incorporating only a small amount of the alkylating agent. In this case [where a diene rubber (iii) comprising a quaternary ammonium group-containing diene rubber (i) and a tertiary amino group-containing diene rubber (ii—ii) is produced], the amount of the alkylating agent is usually in the range of 0.1 to 0.9 equivalent, preferably 0.2 to 0.8 equivalent and more preferably 0.3 to 0.7 equivalent, based on the amount of the tertiary amino group contained in the diene rubber.

The formation of quaternary ammonium group by alkylation can be confirmed by an ordinary method, for example, by the ultraviolet (UV) spectrophotometry or a qualitative analysis using quinhydrone.

The quaternary ammonium group-containing diene rubber (i) of the present invention can be produced by the following processes.

(1) A producing process comprising polymerizing a conjugated diene alone or copolymerizing a conjugated diene and an aromatic vinyl in a hydrocarbon solvent by using an organic active metal as an initiator, to give a homopolymer or copolymer, having an active metal bound to a terminal of the polymer chain thereof; allowing the homopolymer or copolymer to react with a modifier (Y) to introduce a tertiary amino group into the polymer chain terminal; and then, allowing the homopolymer or copolymer to react with an alkylating agent.

(2) A producing process comprising polymerizing a conjugated diene alone or copolymerizing a conjugated diene and an aromatic vinyl in a hydrocarbon solvent by using an organic active metal amide as an initiator, to give a homopolymer or copolymer; and then, allowing the homopolymer or copolymer to react with an alkylating agent.

(3) A producing process comprising polymerizing a conjugated diene alone or copolymerizing a conjugated diene and an aromatic vinyl in a hydrocarbon solvent by using an organic active metal amide as an initiator, to give a homopolymer or copolymer, having an active metal bound to a terminal of the polymer chain thereof; allowing the homopolymer or copolymer to react with a modifier (X) and/or a polyfunctional coupling agent; and then, allowing the homopolymer or copolymer to react with an alkylating agent.

Thus, the diene rubber (i) of the present invention includes a diene rubber having a quaternary ammonium group at a terminal of its polymer chain, a diene rubber at least part of which has been coupled with a polyfunctional coupling agent and/or at least part of which has been modified with the modifier (X), and a mixed rubber comprising these diene rubbers.

Diene Rubber Mixture

The diene rubber mixture of the present invention comprises the above-mentioned quaternary ammonium group-containing diene rubber (i) and other diene rubber (ii). The quaternary ammonium group-containing diene rubber (i) may be used either alone or as a combination of at least two thereof. The other diene rubber (ii) may also be used either alone or as a combination of at least two thereof.

The other diene rubber (ii) is not particularly limited and diene rubbers usually used in the rubber industry can be used. As specific examples of the other diene rubber (ii), there can be mentioned natural rubber (NR), polyisoprene rubber (IR), an emulsion-polymerized styrene-butadiene copolymer rubber (SBR), a solution-polymerized random SBR (bound styrene content: 5 to 50% by weight, 1,2-vinyl bond content in the bound butadiene units: 10 to 80%), high-trans SBR (1,4-trans bond content in the bound butadiene units: 70 to 95%), low-cis polybutadiene rubber (BR), high-cis BR, high-trans BR (1,4-trans bond content in the bound butadiene units: 70 to 95%), a styrene-isoprene copolymer rubber (SIR), a butadiene-isoprene copolymer rubber, a solution-polymerized random styrene-butadiene-isoprene copolymer rubber (SIBR), an emulsion-polymerized SIBR, a emulsion-polymerized styrene-acrylonitrile-butadiene copolymer rubber, an acrylonitrile-butadiene copolymer rubber, and block copolymers such as a high-vinyl SBR-low vinyl SBR block copolymer rubber and a polystyrene-polybutadiene-polystyrene block copolymer rubber. A suitable diene rubber is chosen depending upon the properties required for the rubber. Of these diene rubbers, NR, BR, IR, SBR and SIBR are preferable. These rubbers may be used either alone or a combination of at least two thereof.

Further, other diene rubbers such as the above-mentioned unmodified diene rubber (ii-i), the tertiary amino group-containing diene rubber (ii—ii), other modified diene rubber, and mixtures thereof can be included in the rubber mixture of the present invention.

The quaternary ammonium group-containing diene rubber (i) of the present invention exhibits an enhanced improving effect, and thus, the desired beneficial result can be obtained when the quaternary ammonium group-containing diene rubber (i) is used in an amount of at least 5% by weight, preferably at least 10% by weight and more preferably at least 15% by weight, based on the weight of the diene rubber mixture. Thus, the ratio of the quaternary ammonium group-containing diene rubber (i)/other diene rubber (ii) in the diene rubber mixture is usually in the range of 5/95 to 95/5 by weight, preferably 10/90 to 90/10 by weight and more preferably 15/85 to 85/15 by weight.

Reinforcing Agent

The reinforcing agent used is not particularly limited, and silica and carbon black can be used.

The silica is not particularly limited, and includes, for example, dry-process white carbon, wet-process white carbon, colloidal silica, and precipitated silica described in JP-A S62-62838. Of these, wet-process silica predominantly comprised of hydrous silicic acid is especially preferable. The silica may be used either alone or as a combination of at least two thereof.

The specific surface area of silica is not particularly limited, but is usually in the range of 50 to 400 $m^2/g$, preferably 100 to 250 $m^2/g$ and more preferably 120 to 190 $m^2/g$, as the nitrogen absorption specific surface area measured by the BET method. When the specific surface area is within this range, enhancement of reinforcing effect, abrasion resistance, and processability and reduction of heat build-up can be well attained. The nitrogen absorption specific surface area is measured by the BET method according to ASTM D3037-81.

The carbon black is not particularly limited, and includes, for example, furnace black, acetylene black, thermal black, channel black and graphite. Of these, furnace black is especially preferable, which includes various grades such as SAF, ISAF, ISAF-HA, ISAF-LS, IISAF-HS, HAF, HAF-HS, HAF-LS and FEF. The carbon black may be used either alone or as a combination of at least two thereof.

The specific surface area of the carbon black is not particularly limited, and the nitrogen absorption specific surface area ($N_2SA$) is usually in the range of 5 to 200 $m^2/g$, preferably 50 to 150 $m^2/g$ and more preferably 80 to 130 $m^2g$ in view of the enhanced tensile strength and abrasion resistance. The absorption of DBP by the carbon black is also not particularly limited, but is usually in the range of 5 to 300 ml/100 g, preferably 50 to 200 ml/100 g and more preferably 80 to 160 ml/100 g in view of the enhanced tensile strength and abrasion resistance.

Especially preferable carbon black is high-structure carbon black having a specific surface area of 110 to 170 $m^2/g$ as measured by the method of absorption of cetyltrimethylammonium bromide (CTAB) as described in JP-A H5-230290, and a DBP absorption of 110 to 130 ml/100 g as measured as 4 times' repeated compression at a pressure of 24,000 psi (24M4 DBP). This carbon black highly enhance the abrasion resistance.

The amount of reinforcing agent is in the range of 10 to 200 parts by weight, preferably 20 to 150 parts by weight and more preferably 30 to 120 parts by weight based on 100 parts by weight of the rubber ingredient.

To attain the object of the present invention to a high degree, it is preferable that silica is used alone or in combination with carbon black. In the case where silica is used in combination with carbon black, the mixing ratio of silica to carbon black is suitably chosen depending upon the use or object of rubber, and is usually in the range of 10/90 to 99/1, preferably 30/70 to 95/5 and more preferably 50/50 to 90/10 by weight.

Silane Coupling Agent

In the rubber composition of the present invention, a silane coupling agent is preferably incorporated in addition to silica for further reducing the heat build-up and enhancing the abrasion resistance.

The silica coupling agent is not particularly limited, and includes, for example, vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropylmethyldimethoxysilane, (β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis[3-(triethoxysilyl)propyl]tetrasulfide, and tetrasulfides such as γ-trimethoxysilylpropyldimethylthiocarbamyltetrasulfide and γ-trimethoxysilylpropylbenzothiazyltetrasulfide as described in JP-A H6-248116.

These coupling agents may be used either alone or as a combination of at least two thereof. The amount of the silane coupling agent is usually in th erange of 0.1 to 30 parts by weight, preferably 1 to 20 parts by weight and more preferably 2 to 10 parts by weight, based on 100 parts by weight of silica.

Rubber Composition

The rubber composition of the present invention can comprise, in addition to the above-described ingredients, a vulcanizer, a vulcanization accelerator, a vulcanization promoter, an anti-aging agent, an activator, a plasticizer, a lubricant, a filler and other components in required amounts according to the need.

The vulcanizer is not particularly limited, and includes, for example, sulfur such as powdery sulfur, precipitated sulfur, colloidal sulfur, insoluble sulfur and highly dispersible sulfur; halogenated sulfur such as sulfur monochloride and sulfur dichloride; organic peroxides such as dicumyl peroxide and ditert-butyl peroxide; quinone dioxime such as p-quinone dioxime and p,p'-dibenzoylquinone, dioxime; organic polyamines such as triethylenetetraamine, hexamethylenediamine carbamate and 4,4'-methylene-bis-o-chloroaniline; and alkylphenol resins having a methylol group. Of these, sulfur is preferable and powdery sulfur is especially preferable. These vulcanizers may be used either alone or as a combination of at least two thereof.

The amount of the vulcanizer is usually in the range of 0.1 to 15 parts by weight, preferably 0.3 to 10 parts by weight and more preferably 0.5 to 5 parts by weight, based on 100 parts by weight of the rubber ingredient. When the amount of vulcanizer is within this range, a rubber vulcanizate having enhanced tensile strength, abrasion resistance, thermal resistance and other properties, and reduced permanent set, can be obtained.

As specific examples of the vulcanization accelerator, there can be mentioned sulfenamide vulcanization accelerators such as N-cyclohexyl-2- benzothiazole sulfenamide, N-t-butyl-2-benzothiazole sulfenamide, N-oxyethylene-2-benzothiazole sulfenamide and N,N'-disopropyl-2-benzothiazole sulfenamide; quanidine vulcanization accelerators such as diphenylguanidine diorthootoylylguanidine and orthotolylbiguanidine; thiourea vulcanization accelerators such as thiocarboanilide, diorthotolylthiourea, ethylenethiourea, diethylthiourea and trimethylthiourea; thiazole vulcanization accelerators such as 2-mercaptobenzothiazole, dizenzothiazyl disulfide, 2-mercaptobenzothiazole zinc salt, 2-mercaptobenzothiazole sodium salt, 2-mercaptobenzothiazole cyclohexylamine salt and 2-(2,4-dinitrophenylthio)benzothiazole; thiuram vulcanization accelerators such as tetramethylthiuram monosulfide, tetramethylthiuram disulfide, tetraethylthiuram disulfide, tetrabutylthiuram disulfide and dipentamethylenethiuram tetrasulfide; dithiocarbamate vulcanization accelerators such as sodium dimethyldithiocarbamate, sodium diethyldithiocarbamate, sodium di-n-butyldithiocarbamate, lead dimethyldithiocarbamate, zinc dimethyldithiocarbamate, zinc diethyldithiocarbamate, zinc di-n-butyldithiocarbamate, zinc pentamethylenedithiocarbamate, zinc ethylphenyldithiocarbamate, tellurium diethyldithiocarbamate, selenium dimethyldithiocarbamate, selenium diethyldithiocarbamate, copper dimethyldithiocarbamate, iron dimethydithiocarbamate, dimethylamine diethyldithiocarbamate, piperidine pentamethylenedithiocarbamate and pipecoline methylpentamethylenedithiocarbamate; and xanthogenate vulcanization accelerators such as sodium isopropylxanthogenate, zinc isopropylxanthogenate and zinc butylxanthogenate. Of these, sulfenamide vulcanization accelerators are especially preferable.

These vulcanization accelerators may be used either alone or as a combination of at least two thereof. The amount of the vulcanization accelerator is usually in the range of 0.1 to 15 parts by weight, preferably 0.3 to 10 parts by weight and more preferably 0.5 to 5 parts by weight, based on 100 parts by weight of the rubber ingredient.

The vulcanization promoter is not particularly limited, and includes, for example, higher fatty acids such as stearic acid, and zinc oxide. As the zinc oxide, those which have a particle size of not larger than 5 μm and thus have a high surface activity are preferable. As specific examples of the preferable zinc oxide, there can be mentioned active zinc oxide having a particle size of 0.05 to 0.2 μm and zinc oxide having a particle size of 0.3 to 1 μm. The zinc oxide can be surfacetreated with an amino dispersing agent or a wetting agent.

The vulcanization promoter may be used either alone or as a combination of at least two thereof. The amount of the vulcanization promoter is suitably chosen depending upon the particular kind of vulcanization promoter. When a higher fatty acid is used, its amount is usually in the range of 0.05 to 15 parts by weight, preferably 0.1 to 10 parts by weight and more preferably 0.5 to 5 parts by weight, based on 100 parts by weight of the rubber ingredient. When zinc oxide is used, its amount is usually in the range of 0.05 to 10 parts by weight, preferably 0.1 to 5 parts by weight and more preferably 0.5 to 2 parts by weight, based on 100 parts by weight of the rubber ingredient. When the amount of zinc oxide falls within this range, processesability, tensile strength and abrasion resistance are well balanced.

As examples of the other components, there can be mentioned coupling agents other than the silane coupling agents; activators such as diethylene glycol, polyethylene glycol and silicone oil; fillers such as calcium carbonate, talc and clay; process oil and wax.

The rubber composition of the present invention can be prepared by kneading the respective ingredients by a conventional manner. For example, the rubber ingredient is mixed with the components other than the vulcanizer and the vulcanization accelerator, and then, the rubber ingredient-containing mixture is mixed with the vulcanizer and the vulcanization accelerator to give the rubber composition. The mixing of the the rubber ingredient with the components other than the vulcanizer and the vulcanization accelerator is conducted usually at a temperature of 80 to 200° C., preferably 100 to 190° C. and more preferably 140 to 180° C., for a period of at least 30 seconds, preferably 1 to 30 minutes. The mixing of the rubber ingredient-containing mixture with the vulcanizer and the vulcanization accelerator is conducted by a method wherein the rubber ingredient-containing mixture is cooled usually to a temperature of not higher than 100° C., preferably a temperature between room temperature and 80° C., and then, the mixture is mixed with the vulcanizer and the vulcanization accelerator usually at a temperature of 120 to 200° C., preferably 140 to 180° C. to give the rubber composition.

The invention will now be specifically described by the following production examples, examples and comparative examples. In these examples, parts and % are by weight unless otherwise specified.

The properties of polymers and vuncanized rubbers were evaluated by the following methods.

(1) Bound Styrene Content

The content of bound sytrene in a polymer was determined according to JIS K6383 (a refractive index method).

(2) Content of Vinyl Bond in Bound Butadiene Units

The content of a vinyl bond in the bound butadiene units in a polymer was determined by an infrared spectrophotometry (Hampton method).

(3) Molecular Weight

The weight average molecular weight (Mw) and number average molecular weight (Mn) of a polymer were measured by GPC and expressed in terms of weight average molecular weight and number average molecular weight of a standard polystyrene.

(4) Distribution of Styrene Units

The distribution of styrene units in the polymer chain of a copolymer was determined by a method described in Preliminary Papers—Polymer Society of Japan, vol. 29, No. 9, p 2055- . Namely, a copolymer was subjected to ozonolysis and the products were measured by GPC. The content of an isolated short chain (S1) composed of a styrene unit and the content of a long chain (S8) composed of at least eight connected styrene units in the copolymer were determined, and the ratio of S1/S8 was calculated.

(5) Tensile Strength

Tensile strength was expressed by the modulus in tension at an elongation of 300% (kgf/cm$^2$). The 300% modulus in tension was measured according to JIS K6301, and was expressed by an index number. The larger the index number, the more preferable the rubber.

(6) Heat Build-up

The tanδ was measured at a twist of 1%, a frequency of 20 Hz, and temperatures of 0° C. and 60° C. by using "RDA-II" supplied by Rheometrics Co. The heat build-up was expressed by an index number of the ratio "tanδ(0° C.)/tanδ(60° C.)" as the tanδ ratio of the comparative examples is 100. The larger the index number of the ratio "tanδ(0° C.)/tanδ(60° C.)", the more preferable the rubber.

(7) Abrasion Resistance

The abrasion resistance was measured according to ASTM D2228 by using a Pico type abrasion machine. The abrasion resistance was expressed by an index number. The higher the index number of the abrasion resistance, the more preferable, the rubber.

Production Examples 1 to 6

An autoclave equipped with a stirrer was charged with 8,000 g of cyclohexane, 460 g of styrene and 700 g of butadiene, followed by addition of 3.5 milli-mole of tetramethylethylenediamine (TMEDA) and then 11 milli-mole of n-butyllithium to initiate polymerization at 50° C. When 10 minutes elapsed from the commencement of polymerization, the remainder (840 g) of butadiene was continuously added. After it was confirmed that the convesion reached 100%, 10 milli-mole of N,N-dimethylaminopropylacrylamide (DMAP) was added and a reaction was conducted for 30 minutes. Further, 10 milli-mole of methyl iodide was added and a reaction was conducted for 20 minutes. After completion of the reaction, 20 milli-mole of methanol as a terminator and then 20 g of 2,6-di-t-butylphenol were added. A polymer was recovered by a steam-stripping method to obtain diene rubber (1). The properties of diene rubber (1) were evaluated, and the result are shown in Table 1.

By procedures similar to those employed for the production of diene rubber (1), diene rubbers (2) to (6) were produced wherein the polymerization conditions recited in Table 1 were employed. The evaluation results of the properties of diene rubbers (2) to (6) are shown in Table 1.

Comparative Production Example 1

An autoclave equipped with a stirrer was charged with 8,000 g of cyclohexane, 800 g of styrene and 400 g of butadiene, followed by addition of 20 milli-mole of tetramethylethylenediamine (TMEDA) and then 10 milli-mole of n-butyllithium to initiate polymerization at 50° C. When 10 minutes elapsed from the commencement of polymerization, the remainder (800 g) of butadiene was continuously added. After it was confirmed that the conversion reached 100%, 10 milli-mole of N,N-diemthylaminostyrene (AST) was added and a reaction was conducted for 30 minutes. Then 20 milli-mole of methanol as a terminator and then 20 g of 2,6-di-t-butylphenol were added. A polymer was recovered by a steam-stripping method to obtain diene rubber (7). The properties of diene rubber (7) were evaluated and the result are shown in Table 1.

Production Example 7

An autoclave equipped with a stirrer was charged with 8,000 g of cyclohexane, 310 g of styrene and 600 g of butadiene, followed by addition of 10 milli-mole of tetramethylethylenediamine (TMEDA) and then 10 milli-mole of n-butyllithium to initiate polymerization at 40° C. When 10 minutes elapsed from the commencement of polymerization, the remainder (1,090 g) of butadiene was continuously added. After it was confirmed that the conversion reached 100%, 1 milli-mole of methylethoxysilane was added and a reaction was conducted for 30 minutes. Further, 10 milli-mole of methyl iodide was added and a reaction was conducted for 20 minutes. After completion of the reaction, 20 milli-mole of methanol as a terminator and then 20 g of 2,6-di-t-butyl-phenol were added. A polymer was recovered by a steam-stripping method to obtain diene rubber (8). The properties of diene rubber (8) were evaluated and the result are shown in Table 1.

Comparative Production Example 2

An autoclave equipped with a stirrer was charged with 8,000 g of cyclohexane, 400 g of styrene and 800 g of butadiene, followed by addition of 10 milli-mole of tetramethylethylenediamine (TMEDA) and then 10 milli-mole of n-butyllithium to initiate polymerization at 40° C. When 10 minutes elapsed from the commencement of polymerization, the remainder (800 g) of butadiene was continuously added. After it was confirmed that the conversion reached 100%, 2.5 milli-mole of methylethoxysilane was added and a reaction was conducted for 30 minutes. Then 20 milli-mole of methanol as a terminator and then 20 g of 2,6-di-t-butyl-phenol were added. A polymer was recovered by a steam-stripping method to obtain diene rubber (9). The properties of diene rubber (9) were evaluated and the result are shown in Table 1.

Production Example 8

An autoclave equipped with a stirrer was charged with 8,000 g of cyclohexane, 800 g of styrene and 400 g of butadiene, followed by addition of 20 milli-mole of tetramethylethylenediamine (TMEDA) and then 10 milli-mole of n-butyllithium to initiate polymerization at 50° C. When 10 minutes elapsed from the commencement of polymerization, the remainder (800 g) of butadiene was continuously added. After it was confirmed that the conversion reached 100%, 10 milli-mole of ethylene oxide (EO) was added and a reaction was conducted for 30 minutes. Further, 10 milli-mole of methyl iodide was added and a reaction was conducted for 20 minutes. After completion of the reaction, 20 milli-mole of methanol as a terminator and then 20 g of 2,6-di-t-butyl-phenol were added. A polymer was recovered by a steam-stripping method to obtain diene rubber (10). The properties of diene rubber (10) were evaluated and the result are shown in Table 1.

TABLE 1

| Diene rubber *1 | 1 | 2 | 3 | 4 | 5 | 6 | 7 | 8 | 9 | 10 |
|---|---|---|---|---|---|---|---|---|---|---|
| Polymerization conditions | | | | | | | | | | |
| Amount of styrene chaged | 460 | 400 | 400 | 400 | 400 | 300 | 300 | 310 | 400 | 800 |
| Amount of butadiene charged | 700 | 800 | 800 | 800 | 800 | 600 | 600 | 600 | 800 | 400 |
| Amount of butadiene after-added | 840 | 800 | 800 | 800 | 800 | 1100 | 1100 | 1090 | 800 | 800 |
| Temperature, lowest (° C.) | 50 | 40 | 40 | 40 | 40 | 50 | 50 | 40 | 40 | 50 |
| Temperature, highest (° C.) | 70 | 60 | 60 | 60 | 60 | 80 | 80 | 60 | 60 | 60 |
| Amount of DHA (m-mol) *2 | — | — | — | — | — | — | — | 10 | — | 10 |
| Amount of n-butyllithium (m-mol) | 11 | 10 | 10 | 10 | 10 | 10 | 10 | 10 | 15 | 10 |
| Amount of TEMEDA (m-mol) | 3.5 | 15 | 15 | 15 | 15 | 4 | 4 | 15 | 10 | 4.5 |
| Amount of butadiene added (g) | 10 | 10 | 10 | 10 | 10 | 10 | 10 | 10 | 10 | — |
| Amount of TMS (m-mol) *3 | — | — | — | — | — | — | — | 1 | 2.5 | — |
| Kind of modifier *4 | DAMP | EAB | EAB | EAB | EAB | AST | AST | — | — | EO |
| Amount of modifier (m-mol) | 10 | 10 | 10 | 10 | 10 | 10 | 10 | — | — | 10 |
| Amount of methyl iodide (m-mol) | 10 | 20 | 10 | 2 | — | 10 | — | 10 | — | 10 |
| Amount of butyl iodide (m-mol) | — | — | — | — | 2 | — | — | — | — | — |
| Properties of polymers | | | | | | | | | | |
| Bound styrene content (wt %) | 22.1 | 20.9 | 20.9 | 20.9 | 20.9 | 15.6 | 15.6 | 16.1 | 20.8 | 40.5 |
| 1,2-Vinyl content (%) | 34.2 | 64.2 | 64.2 | 64.2 | 64.2 | 32.0 | 32.0 | 68.2 | 63.1 | 32.1 |
| Styrene distribution S1 (%) *5 | 88.4 | 83.5 | 83.5 | 83.5 | 83.5 | 89.1 | 89.1 | 89.3 | 83.0 | 53.5 |
| Styrene distribution S8 (%) *6 | 0.3 | 0.1 | 0.1 | 0.1 | 0.1 | 0.3 | 0.3 | 0.1 | 0.1 | 2.6 |
| Mw (× $10^4$) | 31.5 | 33.9 | 33.9 | 33.9 | 33.9 | 30.1 | 30.1 | 62.4 | 76.2 | 32.9 |

Note
*1 Production Examples 1 to 8: Diene rubber No. (1) to (6), (8) and (10)
Comparative Production Example 1: Diene rubber (7)
Comparative Production Example 2: Diene rubber (9)
*2 DHA: Di-n-hexylamine
*3 TMS: Tetramethoxysilane
*4 Modifier:
DMAP: N,N-Dimethylaminopropylacrylamide
EAB: 4,4'-Bis(dimethylamino)benzophene
AST: N,N-Dimethylaminostyrene
EO: Ethylene oxide
*5 Content of isolated short chain (Si) composed of a styrene unit
*6 Content of long chain (S8) composed of at least eight connected styrene units

Rubber Composition Examples 1 to 8, Comparative Example 1

Rubber compositions were prepared from diene rubbers (1) through (7) produced in Production Examples 1 to 6 and Comparative Production Example 1 according to the recipe shown in Table 2.

TABLE 2

| Recipe 1 | Initial | 2nd add. | 3rd add. |
|---|---|---|---|
| Raw material rubber | Entire | — | — |
| Silica | 30 | 30 | — |
| Silane coupling agent *1 | 1.5 | 1.5 | — |
| Diethylene glycol | 1 | 1 | — |
| Stearic acid | 1 | 1 | — |
| Zinc oxide | — | Varied | — |
| Aroma-oil | — | 15 | — |
| Wax *2 | — | 5 | — |
| Aging stabiiizer *3 | — | 2 | — |
| Sulfur | — | — | 1.5 |
| Vulcanization accelerator *4 | — | — | 3 |

Note:
*1 "Si 69" Supplied by Degussa Co.
*2 "Splender R-100", supplied by Kao Corp.
*3 "Nocrac 6C", supplied by Ohuchi Shinko K.K.
*4 "Nocceler CZ", supplied by Ohuchi Shinko K.K.

By using a Brabender type mixer having a volume of 250 ml, the entire amount of each diene rubber, a half amount of silica, a half amount of a silane coupling agent, a half amount of diethylene glycol and a half amount of stearic acid were mixed together at 170° C. for 2 minutes, and then, the components other than sulfur and the vulcanization accelerator were added, and the mixture was kneaded at the same temperature for 2 minutes. The amounts of the raw material rubber and zinc oxide are shown in Table 3.

The kneaded mixture was kneaded together with sulfur and the vulcanization accelerator at 50° C. by an open roll, and then was subjected to press vulcanization at 160° C. for 30 minutes to prepare test specimens. The properties of the specimens were evaluated. The results are shown in Table 3.

TABLE 3

|  | Example | | | | | | | | CE *1 |
| --- | --- | --- | --- | --- | --- | --- | --- | --- | --- |
|  | 1 | 2 | 3 | 4 | 5 | 6 | 7 | 8 | 1 |
| Diene rubber No. | | | | | | | | | |
| (1) | 100 | 100 | — | — | — | — | — | — | — |
| (2) | — | — | 100 | — | — | — | — | — | — |
| (3) | — | — | — | 100 | — | — | — | — | — |
| (4) | — | — | — | — | 100 | — | — | — | — |
| (5) | — | — | — | — | — | 100 | — | — | — |
| (6) | — | — | — | — | — | — | 100 | 100 | — |
| (7) | — | — | — | — | — | — | — | — | 100 |
| Components *2 | | | | | | | | | |
| Silica *3 | — | — | 60 | 60 | 60 | 60 | — | — | — |
| Silica *4 | 60 | 60 | — | — | — | — | 60 | — | — |
| Silica *5 | — | — | — | — | — | — | — | 60 | 60 |
| ZnO | 1.5 | 3.0 | 1.5 | 1.5 | 1.5 | 1.5 | 3.0 | 3.0 | 3.0 |
| Properties | | | | | | | | | |
| Modulus *6 | 120 | 116 | 155 | 147 | 125 | 128 | 108 | 103 | 100 |
| Heat bld-up *7 | 195 | 188 | 665 | 635 | 580 | 550 | 133 | 128 | 100 |
| Abrasion *8 | 121 | 117 | 141 | 135 | 125 | 130 | 114 | 108 | 100 |

Note:
*1 CE: Comparative Example
*2 Amount of components added (parts by weight)
*3 "Z1165 MP" (nitrogen adsorption specific surface area = 175 m²/g; supplied by Rhone Poulenc)
*4 "Ultrasil VN3" (nitrogen adsorption specific surface area = 200 m²/g; supplied by Degussa)
*5 "Nipsil VN3" (nitrogen adsorption specific surface area = 240 m²/g; supplied by Nippon Silica)
*6 Index of 300% modulus in tension, expressed as the modulus of Comparative Example 1 is 100.
*7 Index of heat build-up, expressed as the modulus of Comparative Example 1 is 100.
*8 Abrasion resistance, expressed as the modulus of Comparative Example is 100.

As seen from Table 3, rubber compositions comprising the diene rubber of the present invention (Rubber Composition Examples 1 to 8) have the three properties superior to those of a rubber composition comprising a tertiary amino group-containing diene rubber (Comparative Example 1). When the degree of formation of quaternary ammonium group is 10% based on the tertiary amino group, the intended improvement effect can be attained (Rubber Composition Examples 5 and 6). As the degree of formation of quaternary ammonium group is increased, the rubber is more improved (Rubber Composition Examples 3 and 4). When the alkylating agent used has an alkyl group with a small number of carbon atoms, the rubber is more improved (Comparison between Rubber Composition Examples 5 and 6). When silica having a small specific surface area is incorporated, the three properties are improved and especially the heat build-up is greatly reduced (comparison between Rubber Composition Examples 7 and 8). When the amount of zinc oxide is reduced, the improvement effect is high (comparison between Rubber Composition Examples 1 and 2).

Rubber Composition Examples 9 to 12, Comparative Example 2

Rubber compositions were prepared from diene rubbers (8), (9) and (10), produced in Production Examples 7 and 8 and Comparative production Example 2, and a commercially available diene rubber according to the recipe 2 shown in Table 4.

TABLE 4

| Recipe 2 | Initial | 2nd add. | 3rd add. |
| --- | --- | --- | --- |
| Raw material rubber | Entire | — | — |
| Silica *1 | Half | Half | — |
| Carbon black *2 | — | Varied | — |
| Silane coupling agent *3 | 1.5 | 1.5 | — |
| Aroma-oil | — | 25 | — |
| Diethylene glycol | — | 2 | — |
| Zinc oxide | — | 1.5 | — |
| Stearic acid | — | 2 | — |
| Wax *4 | — | 5 | — |
| Aging stabilizer *5 | — | 2 | — |
| Sulfur | — | — | 1.4 |
| Vulcanization accelerator *6 | — | — | 3 |

Note:
*1 "Z1165 MP"
*2 "Seast KH", supplied by Tokai Carbon K.K.
*3 "Si 69"
*4 "Splender R-100"
*5 "Nocrac 6C"
*6 "Nocceler CZ"

By using a Brabender type mixer having a volume of 250 ml, the entire amount of each diene rubber, a half amount of silica and a half amount of a silane coupling agent were mixed together at 170° C. for 2 minutes, and then, the components other than sulfur and the vulcanization accelerator were added, and the mixture was kneaded at the same temperature for 3 minutes. The amounts of the raw material rubber and zinc oxide are shown in Table 5.

The kneaded mixture was kneaded together with sulfur and the vulcanization accelerator at 50° C. by an open roll, and then was subjected to press vulcanization at 160° C. for 30 minutes to prepare test specimens. The properties of the specimens were evaluated. The results are shown in Table 5.

TABLE 5

|  | Example | | | | C.E.1 |
| --- | --- | --- | --- | --- | --- |
|  | 9 | 10 | 11 | 12 | 2 |
| Diene rubber No. (parts) | | | | | |
| (8) | — | 80 | 60 | 40 | — |
| (9) | — | — | — | — | 80 |
| (10) | 100 | — | — | — | — |
| BR 1220 *1 | — | 20 | — | — | 20 |
| RSS3 *2 | — | — | 40 | 60 | — |
| Components (parts) | | | | | |
| Silica | 60 | 70 | 70 | 70 | 70 |
| Carbon black | 20 | — | — | — | — |
| Properties | | | | | |
| Modulus in tension *3 | 142 | 110 | 132 | 121 | 100 |
| Heat build-up *3 | 109 | 136 | 128 | 107 | 100 |
| Abrasion resistance *3 | 147 | 108 | 125 | 120 | 100 |

Note:
*1 Polybutadiene (supplied by Nippon Zeon Co.)
*2 Natural Rubber
*3 These indexes are expressed as the data in Comparative Example 2 are 100.

As seen from Table 5, even when both silica and carbon black are incorporated together as reinforcing agents in the diene rubber of the present invention, all of the modulus in tension, heat build-up and abrasion resistance are improved (Rubber Composition Example 9). Even when the diene rubber of the present invention is used in combination with other diene rubber, a high improvement effect can be attained, and further, by the combination with other diene rubber, the three properties are well balanced (Rubber Composition Examples 10 to 12).

INDUSTRIAL APPLICABILITY

By the present invention, a satisfactory rubber composition can be obtained, which exhibits greatly improved tensile strength and abrasion resistance while a good rolling resistance attained by the incorporation of silica can be kept. Therefore, the diene rubber of the present invention and the rubber composition comprising the diene rubber have a wide use, and can be used, for example, as tire parts such as tread, carcass, sidewall and bead; rubber articles such as hoses, window frames, belts, shoe soles, vibration insulators and automobile parts; and reinforcing rubbers for high impact polystyrene, ABS resin and other resins. The rubber composition of the present invention is especially useful for tread of tires of low fuel consumption, and further for tread, sidewall, under-tread, carcass and bead of four-seasons tires, high-performance tires and studless tires.

What is claimed is:

1. A diene rubber comprised of a conjugated diene/aromatic vinyl copolymer; said copolymer having on at least one end of its polymer chain a quaternary ammonium group to which four carbon atoms have been bound; at least 10% by weight of the bound conjugated diene units being a vinyl bond; said copolymer further having a weight average molecular weight (Mw) of 100,000 to 2,000,000; the ratio of conjugated diene units/aromatic vinyl units in the copolymer being in the range of 40/60 to 95/5 by weight; the content of an isolated short chain composed of one aromatic vinyl unit in the copolymer being at least 40% by weight based on the weight of the total bound aromatic vinyl units; and the content of a long chain composed of at least eight connected aromatic vinyl units in the copolymer being not larger than 5% by weight based on the weight of the total bound aromatic vinyl units.

2. The diene rubber according to claim 1, wherein the ratio of conjugated diene units/aromatic vinyl units in the copolymer is in the range of 50/50 to 90/10 by weight.

3. The diene rubber according to claim 1, wherein the content of an isolated short chain composed of one aromatic vinyl unit in the copolymer is at least 60% by weight based on the weight of the total bound aromatic vinyl units, and the content of a long chain composed of at least eight connected aromatic vinyl units in the copolymer is not larger than 2.5% by weight based on the weight of the total bound aromatic vinyl units.

4. The diene rubber according to claim 1, wherein the quaternary ammonium group is represented by the general formula (1):

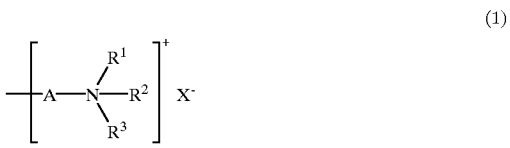

wherein each of $R^1$, $R^2$ and $R^3$ is an alkyl group, an aryl group or an aralkyl group, A is an alkylene group, an arylene group, an arylene-alkylene group, an alkylene-arylene group or a connecting group represented by the formula —C(=O)—M—$R^4$— (wherein M is an oxy group or an NH group, $R^4$ is an alkylene group, an arylene group, an arylene-alkylene group or an alkylene-arylene group), X is a halogen atom, and $R^1$ and A may form together a hetero ring.

5. A diene rubber mixture comprised of the diene rubber as claimed in claim 1, and a diene rubber having no quaternary ammonium group.

6. The diene rubber mixture according to claim 5, wherein the diene rubber having no quaternary ammonium group is at least one kind of rubber selected from a group consisting of natural rubber, a polybutadiene rubber, a polyisoprene rubber, a styrene-butadiene copolymer rubber, a styrene-isoprene-butadiene copolymer rubber, an unmodified diene rubber and a diene rubber having a tertiary amino group.

7. A process for producing a diene rubber characterized in that a conjugated diene is polymerized alone or a conjugated diene and an aromatic vinyl are copolymerized in a hydrocarbon solvent by using an organic active metal amide as an initiator, to give a homopolymer or copolymer; and then the homopolymer or copolymer is allowed to react with an alkylating agent.

8. A process for producing a diene rubber characterized in that a conjugated diene is polymerized alone or a conjugated diene and an aromatic vinyl are copolymerized in a hydrocarbon solvent by using an organic active metal amide as an initiator, to give a homopolymer or copolymer, having an active metal bound to a terminal of the polymer chain thereof; the homopolymer or copolymer is allowed to react with a polyfunctional coupling agent and/or a modifier (X); and then the homopolymer or copolymer is allowed to react with an alkylating agent.

9. The process for producing a diene rubber according to claim 7, wherein the organic active metal amide is a product produced by reacting an organic active metal with a secondary amine prior to the polymerization or a product produced by reacting an organic active metal with a secondary amine during polymerization.

10. The process for producing a diene rubber according to claim 8, wherein the modifier (X) is at least one compound selected from a group consisting of compounds having in the molecule a functional group capable of reacting with the active metal, and a tertiary amino group; compounds having in the molecule a nitrogen-carbon double bond, said nitrogen having a substituent or substituents; ketones; aldehydes; epoxy compounds and cyclic imine compounds having 2 or 3 carbon atoms.

11. The process for producing a diene rubber according to claim 8, wherein the polyfunctional coupling agent is at least one coupling agent selected from tin-containing coupling agents, silicon-containing coupling agents, metal halide coupling agents, unsaturated nitrile coupling agents, halogenated hydrocarbon coupling agents, ester coupling agents, halide coupling agents and phosphorous-containing coupling agents.

12. The process for producing a diene rubber according to claim 7, wherein the alkylating agent is at least one compound selected from alkyl nitrates, dialkyl sulfates, arylsulfonic acid alkyl esters and monohalides, and is preferably a monohalide.

13. A rubber composition comprising a rubber ingredient and a reinforcing agent; said rubber ingredient comprising a diene rubber as claimed in claim 1.

14. The rubber composition according to claim 13, wherein the reinforcing agent is at least one selected from a group consisting of carbon black and silica.

15. The rubber composition according to claim 14, which comprises a silica reinforcing agent and a silane coupling agent.

16. The rubber composition according to claim 13, which further comprises a vulcanizer, a vulcanization accelerator and a vulcanization promotor.

* * * * *